United States Patent [19]

Krieger et al.

[11] Patent Number: 5,145,053

[45] Date of Patent: Sep. 8, 1992

[54] CONVEYOR APPARATUS IN PACKAGING MACHINES

[75] Inventors: Eberhard Krieger, Weinstadt Walter Dietrich, Weinstadt, Siegfried Weber, Rudersberg, all of Fed. Rep. of Germany

[73] Assignee: Robert Bosch GmbH, Stuttgart, Fed. Rep. of Germany

[21] Appl. No.: 760,668

[22] Filed: Sep. 16, 1991

[30] Foreign Application Priority Data

Nov. 16, 1990 [DE] Fed. Rep. of Germany ....... 4036510

[51] Int. Cl.$^5$ .............................................. B65G 15/14
[52] U.S. Cl. .................................... 198/626.5; 198/817
[58] Field of Search ............... 198/626.1, 626.5, 626.6, 198/817

[56] References Cited

U.S. PATENT DOCUMENTS

| | | | |
|---|---|---|---|
| 2,662,355 | 12/1947 | Ross | 53/566 |
| 2,736,421 | 2/1956 | Bell | 198/803.11 |
| 3,325,977 | 6/1967 | Kirsten | 198/626.5 X |
| 3,509,681 | 5/1970 | Sass | 53/473 |
| 4,502,592 | 3/1985 | Ramcke | 198/626.5 |
| 4,508,210 | 4/1985 | Ramcke et al. | 198/626.5 |
| 4,529,082 | 7/1985 | Mally | 198/626.5 X |
| 4,641,742 | 2/1987 | Igarashi et al. | 198/626.5 |
| 4,874,067 | 10/1989 | Greenwell | 198/626.5 X |
| 4,978,836 | 12/1990 | Dieudonné et al. | 198/626.5 X |

Primary Examiner—Robert P. Olszewski
Assistant Examiner—Cheryl L. Gastineau
Attorney, Agent, or Firm—Robbins & Robbins

[57] ABSTRACT

A conveyor system in a packaging machine having leading and trailing drivers, which are disposed on endless parallel conveyor chains. To adjust the drivers to various sized boxes, the conveyor chains are adjustable transversely to the conveyor direction and are adjustable in phase. The chain wheels guiding the outer conveyor chains having the trailing drivers are disposed in a manner fixed against relative rotation, and one chain wheel is additionally axially displaceably disposed on the drive shaft. The middle chain wheel, which guides the conveyor chain having the leading drivers, is mounted on a hollow shaft disposed in a rotatable and axially displaceable manner on the drive shaft; this hollow shaft penetrates the hub of one outer chain wheel and has an aperture for an adjusting spring that connects the hub to the drive shaft. With a clamping ring that is secured in a sleeve engaging the hollow shaft, the middle chain wheel is joined to the drive shaft in an angularly adjustable manner and rotatable therewith.

12 Claims, 3 Drawing Sheets

CONVEYOR APPARATUS IN PACKAGING MACHINES

BACKGROUND OF THE INVENTION

The invention is based on an apparatus for conveying articles in packaging machines, particularly for previously formed boxes in cartoning machines. To adjust the conveyor apparatus to various sizes and shapes of previously formed boxes, it is known from U.S. Pat. No. 3,509,681 to adjust the conveyor chain carrying the leading drivers relative to the conveyor chains carrying the trailing drivers in their phase location to one another by rotating the gear wheels supporting the chains by a certain angle. To this end, at least one chain wheel is joined to a central shaft in a manner fixed against relative rotation, and the two gear wheels disposed axially beside it are connectable to the central shaft by a coupling. If the coupling is released, adjustment of the first set of drivers spaced apart from the other drivers is possible by rotating the gear wheels. In the known conveyor apparatus, an adjustment of the drivers transversely to the conveying direction is also possible by axial displacement of the chain wheels on the shafts bearing them, so that the drivers can also be adjusted to the length of the previously formed boxes to be handled.

OBJECT AND SUMMARY OF THE INVENTION

The conveyor apparatus according to the invention has the advantage that adjustment of the spacing of the leading drivers relative to the trailing drivers can be performed in a simple manner, without intervening in the conveyor chains of the conveyor apparatus from the operating side, and that nevertheless a lateral adjustment of the drivers can be performed.

Advantageous further features of and improvements to the conveyor apparatus disclosed are possible with the characteristics recited hereinafter. With the arrangement set forth, the drivers can be rapidly adjusted to a specified format in a simple manner.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
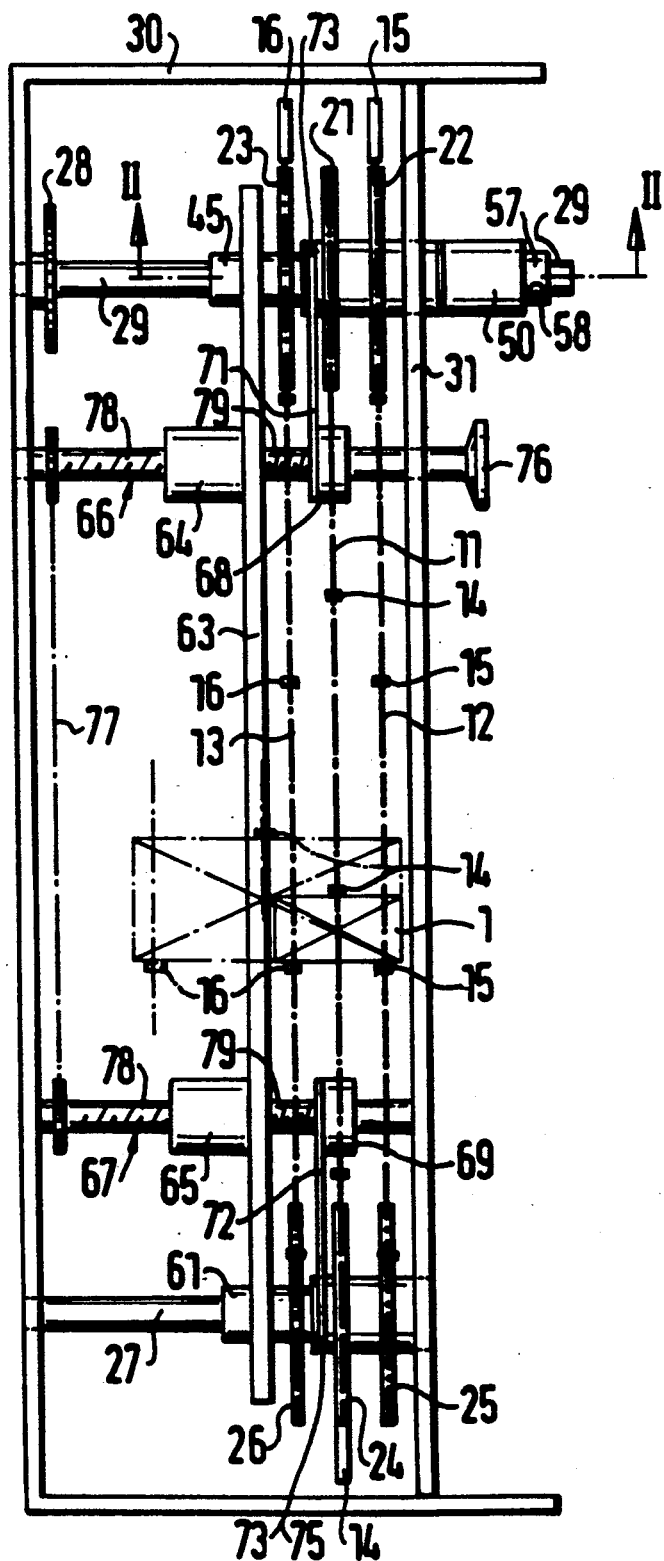
FIG. 1 shows the previously formed box conveyor apparatus of a cartoning machine in simplified form in a plan view.

A conveyor system for previously formed boxes 1 has three endless conveyor chains 11, 12, 13 extending parallel to and adjacent one another and carrying drivers 14, 15, 16, respectively. Three drivers 14, 15, 16 at a time form one box carrying unit and carry one previously formed box 1 along a rectilinear horizontal conveyor path; a leading driver 14 rests on the front wall, and two trailing drivers 15, 16 rest on the rear wall of the previously formed box 1. The endless conveyor chains 11, 12, 13 travel around two deflection paths, where they are guided on coaxial chain wheels 21, 22, 23 and 24, 25, 26. The chains wheels 24, 25, 26 of one deflection path are supported freely rotatably and axially displaceably on a shaft 27. The chain wheels 21, 22, 23, by contrast, are joined in a manner fixed against relative motion with a central shaft 29 driven by a gear wheel 28.

Figure 2:
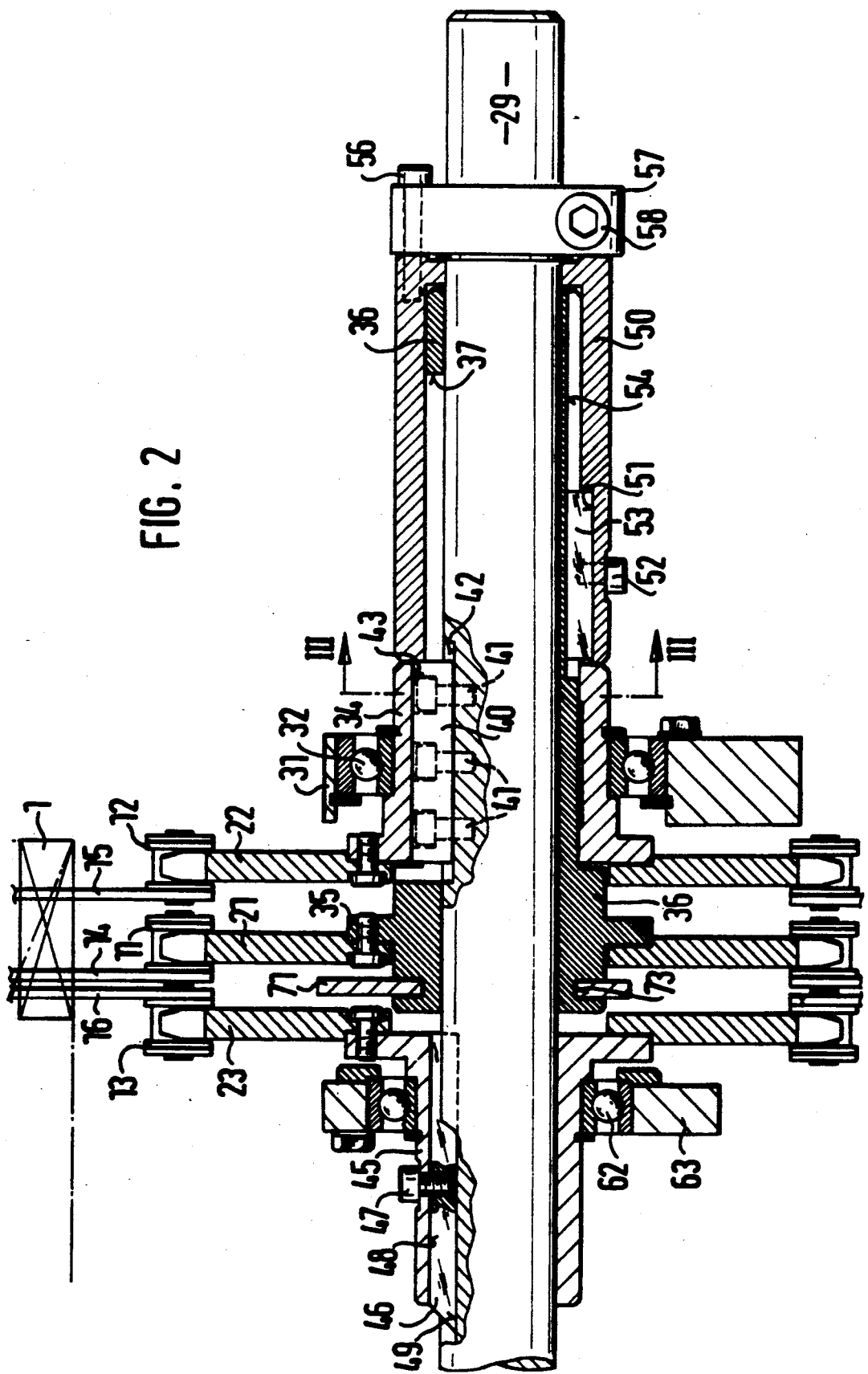
FIG. 2 shows a deflection path with chain wheels of the conveyor apparatus of FIG. 1, on a larger scale in a longitudinal section taken along the plane II—II of FIG. 1.
Figure 3:
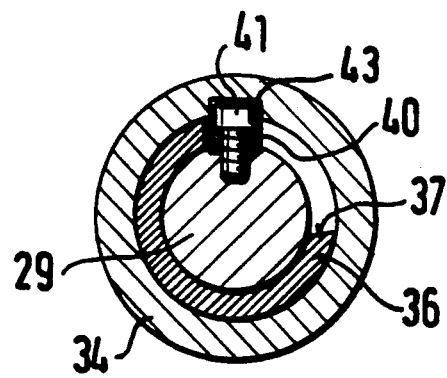
FIG. 3 is a cross section taken along the plane III—III of FIG. 2.

To adjust the spacing between one driver 14 and the other two drivers 15, 16 of one unit in order to adapt to the width of the size and shape of previously formed boxes 1 to be handled, the middle chain wheel 21, which guides the conveyor chain 11 with the leading drivers 14, is adjustable and settable in its angular or phase location relative to the two outer chain wheels 22, 23 that guide the two conveyor chains 12, 13 having the trailing drivers 15, 16. One outer chain wheel 22, located near the operating side, is firmly joined to a hub 34 (FIG. 2), which by means of a ball bearing 32 is supported rotatably in place in one wall 31 of the machine frame 30. The middle chain wheel 21 is secured to a collar 35 of a hollow shaft 36 that penetrates the hub 34 of the one chain wheel 22 and is supported rotatably in it and itself rotatably receives the central shaft 29. In the region of coincidence with the hub 34 of the chain wheel 22, the hollow shaft 36 has an elongated, partial circular aperture 37, which extends axially by a multiple of this coincidence region and extends circumferentially over an angle on the order of approximately 100°. Protruding through this aperture 37 is an adjusting spring 40, which is secured with screws 41 in a longitudinal groove 42 in the shaft 29 and engages a longitudinal axially aligned groove 43 in the hub 34 (FIG. 3), so that an outer chain wheel 22 is joined to the shaft 29 in a torsion-free manner. The outer chain wheel 23 is also joined in a torsion-free manner to the central shaft 29 but is also axially displaceable thereon. To this end, this chain wheel 23 is firmly secured to a hub 45, which is axially displaceable on the shaft 29 and is secured against torsion by an adjusting spring 46 that is secured with a screw 47 in a longitudinal axially aligned groove 48 in the hub 45 and engages a longitudinal groove 49 in the shaft 29. To enable axially displacing the chain wheel 23 on the shaft 29 the length of the longitudinal groove 49 in the shaft 29 is a multiple of the length of the adjusting spring 46

The hollow shaft 36 having the middle gear wheel 21 is likewise axially displaceable on the central shaft 29 and is additionally rotatable by an angle allowed by its aperture 37 in relation to the adjusting spring 40. To enable joining it to the shaft 29 in a manner fixed against relative rotation, it is encompassed and gripped by a sleeve 50, which in an inner longitudinal groove 51 has an adjusting spring 53 retained by a screw 52 and engaging an outer longitudinal groove 54 of the hollow shaft 36. The longitudinal groove 54 extends over the entire part of the hollow shaft 36 protruding beyond the hub 34, so that the hollow shaft 36 is displaceable axially with respect to the sleeve 50.

A clamping ring 57 is secured with a screw 56 to the face end of the sleeve 50, which axially adjoins the hub 34 of one outer chain wheel 22, and extends toward the operating side via the shaft 29; the clamping ring 57 is firmly clamped on the end of the shaft 29 with a screw 58. If the screw 58 is loosened, then by rotating the sleeve 50, the middle chain wheel 21 can be rotated via the hollow shaft 36 relative to the two outer chain wheels 22, 23, so that the chain wheel 21 moves the conveyor chain 11, and thus the spacing between the leading drivers 14 and the trailing drivers 15, 16 is increased or decreased, to adapt the spacing to the width of the previously formed boxes 1 to be handled.

To enable adapting the spacing of the drivers 14, 15, 16 extending side by side to the length of the previously formed boxes 1 as well, the various conveyor chains 11, 12, 13, With the chain wheels 21, 22, 23 and 24, 25, 26 guiding them are adjustable relative to one another and transversely to the conveying direction. To this end, the chain wheels 22, 23 and 24, 26 located away from the operating side are disposed axially displaceably on the shaft 29 and the shaft 27, while contrarily the chain wheels 22 and 25 close to the operating side are stationary. The other outer chain wheels 23, 26, on their hubs 45, 61 via ball bearings 62, carry a cheek 63 disposed parallel to the conveyor chain 13 and having a threaded support 64; this cheek is adjustable transversely by means of two screw spindles 66, 67 supported in the machine frame. The middle conveyor chain 11 is likewise adjusted with the two screw spindles 66, 67, which additionally have two threaded cuffs 68, 69 with forks 71, 72 that engage a circumferential groove 73 in the hub 35 and 75, respectively, of the chain wheels 21, 24. For simultaneous rotation of the two screw spindles 66, 67, one screw spindle 66 has a handwheel 76, and the two screw spindles 66, 67 are coupled to one another by a chain drive 77. To assure that the lateral spacing of the drivers 14, 15, 16 is approximately the same in all the format positions when the conveyor chains 11, 13 are adjusted transversely, the inclination of the threaded part 78 carrying the support 64, 65 of the cheek 63 is twice that of the threaded portion 79 carrying the threaded cuffs 68, 69 of the forks 71, 72.

The adjustment of the conveyor system to a given size of the previously formed boxes 1 to be handled is carried out as follows:

Beginning for instance with the setting shown in FIG. 1 for the smallest size box, in which the conveyor chains 11, 12, 13 are located most closely side by side, and the spacing between the leading drivers 14 and the trailing drivers 15, 16 is the least, the two conveyor chains 11 and 13 are first moved to the left into the desired position by rotation of the handwheel 76 (this position of the maximum possible later spacing is shown in dot-dashed lines in FIG. 1). The setting can be read off from a scale, not shown. The number of revolutions can also be specified; the value to be set is read off from a counter connected to the screw spindle 66. Instead of the manual adjustment, an adjustment by means of a control motor is also possible; this motor is controlled to adjust certain sized boxes and controlled by a computer.

To set the drivers 14, 15, 16 to the width of the previously formed boxes 1 to be handled, the clamping ring 57 is first loosened by loosening the screw 58, so that the rotational connection with the shaft 29 is disconnected. After that, the sleeve 50 is rotated, which via the adjusting spring 53 jointly rotates the hollow shaft 36 with its collar 35 and the middle chain wheel 21, so that the middle conveyor chain 11 with the leading drivers 14 is adjusted relative to the trailing drivers 15, 16. Once the desired spacing has been set, the clamping ring 57 is tightened again, thus re-establishing a rotationally fixed connection between the shaft 29 and the sleeve 50. The region of box size settability is defined substantially by the opening angle and length of the aperture 37 in the hollow shaft 36, through which the adjusting spring 40 for connecting one outer chain wheel 22 to the shaft 29 protrudes.

Figure 4:
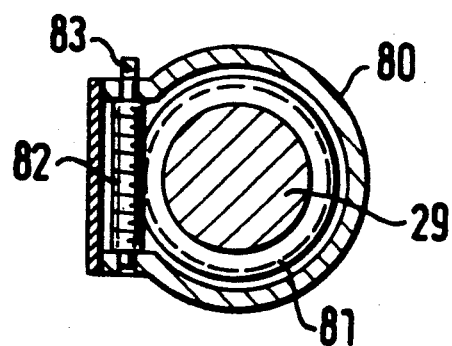
FIG. 4 shows a cross-sectional view of an adjusting apparatus for the conveyor system of FIG. 2.

Setting of the spacing of the drivers 1 relative to the drivers 15, 16 can also be performed by means of a self-locking adjusting gear, which is for instance shown in FIG. 4. To this end, instead of the clamping ring 57, an annular housing 80 is firmly secured to the face end of the sleeve 50, surrounding a worm wheel 81 secured to the shaft 29. A worm spindle 82 supported in the housing 80 meshes at a tangent with this worm wheel 81; one end of the worm spindle 82 protrudes from the housing and has a key head 83. Rotating the worm spindle 82 rotates the housing 80, so that with it the hollow shaft 36 and the middle chain wheel 21 and the middle conveyor chain 11 having the leading drivers 14 are all adjusted via the sleeve 50. As mentioned above, the spacing of the drivers 14 can also be set by a predetermined certain number of revolutions of the worm spindle 82. A control motor, with which the box size conversion can be controlled with a computer support can also be provided on the housing.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A system for conveying articles in packaging machines, in particular different sized previously formed boxes in cartoning machines, comprising a plurality of endless conveyor chains, each of said endless conveyor chains including a plurality of drivers spaced at equal intervals, of which leading and trailing drivers of one guide unit contact front and back sides of a box in a dimensionally stable manner for movement of boxes with movement of said endless conveyor chains guided on chain wheels driven by a drive shaft over at least one deflection path, said chain wheels are adjustable in terms of rotational angle relative to each other on said drive shaft carrying the chain wheels to set a spacing between the leading drivers and the trailing drivers, said chain wheels include a first and a second axially outer chain wheel (22, 23), which guide first and second outer conveyor chains (12, 13) with identically aligned drivers (15, 16), said first and second chain wheels are joined in a manner fixed against relative rotation to said drive shaft (29); a middle chain wheel (21) is disposed between the first and second outer chain wheels (22, 23) and is firmly joined to a hollow shaft (36) that is rotatable o the drive shaft; said hollow shaft (36) penetrates the first outer chain wheel (22) and has a wide-angle longitudinal aperture (37) for a passage of a connecting means (40) through said aperture (37) to connect the first outer chain wheel to the drive shaft (29) and that the drive shaft (29) and the hollow shaft (36) are joined together adjustably in terms of rotational angle.

2. A conveyor system as defined by claim 1, in which the connecting means (40) that connects the first outer chain wheel (22) to the drive shaft (29) engages a recess (43) of the chain wheel (22), penetrates the aperture (37) of the hollow shaft (36) to engage a recess (42) in the drive shaft (29).

3. A conveyor system as defined by claim 2, in which the aperture (37) in the hollow shaft (36) extends over a circumferential angle that amounts to a multiple of the width of the connecting means (40).

4. A conveyor system as defined by claim 1, in which the first outer chain wheel (22) is disposed stationary with respect to the drive shaft (29); that the second outer chain wheel (23) is axially displaceable on the drive shaft (29); and that the axial extension of the aperture (37) of the hollow shaft (36) amounts to a multiple of the axial length of the connecting means (40) for axial adjustment of the middle chain wheel (21).

5. A conveyor system as defined by claim 2, in which the first outer chain wheel (22) is disposed stationary with respect to the drive shaft (29); that the second outer chain wheel (23) is axially displaceable on the drive shaft (29); and that the axial extension of the aperture (37) of the hollow shaft (36) amounts to a multiple of the axial length of the connecting means (40) for axial adjustment of the middle chain wheel (21).

6. A conveyor system as defined by claim 3, in which the first outer chain wheel (22) is disposed stationary with respect to the drive shaft (29); that the second outer chain wheel (23) is axially displaceable on the drive shaft (29); and that the axial extension of the aperture (37) of the hollow shaft (36) amounts to a multiple of the axial length of the connecting means (40) for axial adjustment of the middle chain wheel (21).

7. A conveyor system as defined by claim 4, in which the part of the hollow shaft (36) penetrating the first outer chain wheel (22) is surrounded by a sleeve (50) and is connected to said sleeve (50) by a connecting means (53) in a manner fixed against rotation but axially adjustably relative to said drive shaft; and that the sleeve (50) is joined in an angularly adjustable manner to the drive shaft (29) via a connecting means (57; 80 to 82).

8. A conveyor system as defined by claim 5, in which the part of the hollow shaft (36) penetrating the first outer chain wheel (22) is surrounded by a sleeve (50) and is connected to said sleeve (50) by a connecting means (53) in a manner fixed against rotation but axially adjustably relative to said drive shaft; and that the sleeve (50) is joined in an angularly adjustable manner to the drive shaft (29) via a connecting means (57; 80 to 82).

9. A conveyor system as defined by claim 6, in which the part of the hollow shaft (36) penetrating the first outer chain wheel (22) is surrounded by a sleeve (50) and is connected to said sleeve (50) by a connecting means (53) in a manner fixed against rotation but axially adjustably relative to said drive shaft; and that the sleeve (50) is joined in an angularly adjustable manner to the drive shaft (29) via a connecting means (57; 80 to 82).

10. A conveyor system as defined by claim 7, in which the connecting means between the sleeve (50) and the central shaft (29) is a self-locking adjusting gear (80 to 82).

11. A conveyor system as defined by claim 8, in which the connecting means between the sleeve (50) and the central shaft (29) is a self-locking adjusting gear (80 to 82).

12. A conveyor system as defined by claim 9, in which the connecting means between the sleeve (50) and the central shaft (29) is a self-locking adjusting gear (80 to 82).

* * * * *